E. F. W. ALEXANDERSON.
SINGLE PHASE MOTOR CONTROL.
APPLICATION FILED JAN. 4, 1908.

927,397.

Patented July 6, 1909.
3 SHEETS—SHEET 2.

Witnesses:
George W. Tilden
J. Ellis Glen

Inventor:
Ernst F. W. Alexanderson,
by Albert G. Davis
Att'y.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

SINGLE-PHASE-MOTOR CONTROL.

No. 927,397.　　　Specification of Letters Patent.　　Patented July 6, 1909.

Application filed January 4, 1908. Serial No. 409,271.

*To all whom it may concern:*

Be it known that I, ERNST F. W. ALEXANDERSON, a citizen of the United States, residing at Schnectady, county of Schenectady, State of New York, have invented certain new and useful Improvements in Single-Phase-Motor Control, of which the following is a specification.

My invention relates to the control of single-phase motors of the commutator type having inducing and exciting windings on the stator, and consists in an improvement in the method of control described in my former application, Serial No. 383,807, filed July 15, 1907.

In my former application I pointed out the fact that in what is known as the repulsion motor, in which the armature is short-circuited, there exists an inducing field which for low speeds has a good effect on commutation, since the electromotive force induced, by cutting this field, in the armature coils short-circuited by the brushes opposes the electromotive force due to the transformer action of the exciting or cross-field; but that at high speed the electromotive force due to cutting the inducing field, becomes excessive. I, accordingly, disclosed a control system in which for low speeds the armature is short-circuited, while at higher speeds an electromotive force is introduced into the armature circuit, which reduces the strength of the inducing field, and also the exciting winding is introduced into the armature circuit in order to produce a field, which tends to neutralize commutation reactance.

My present invention relates to a control system of this character, and has particular reference to the starting connections and to the transitions from one running connection to another. For instance, when the change is made from the low-speed connection, in which the armature is short-circuited, to the high-speed connection, in which a shunt-voltage is impressed on armature and exciting winding in series, there is some liability to flashing at the commutator, unless the change is made gradually. If the shunt-voltage is impressed on armature and exciting windings in series before the armature short-circuit is broken, the motor is made momentarily, practically a shunt motor, and this sudden change in its characteristic may produce flashes. On the other hand, if the armature circuit is broken before the connections are made to the source of shunt-voltage, the motor is transformed suddenly from a repulsion motor to a series motor. In this event also, flashing at the commutator may be produced. My invention, in one aspect, consists in the method of operating a motor by starting it with its armature short-circuited, then impressing a shunt-voltage on the exciting winding and short-circuited armature through a resistance, then opening the armature short-circuit, and then cutting out the resistance. In this manner a gradual transition is obtained, and all tendency to flash is avoided.

My invention further comprises an arrangement of electrically-interlocked switches whereby the transitional connections above described are produced automatically in proper sequence.

My invention further comprises certain improvements in the method of starting and in the starting connections.

My invention will best be understood by reference to the accompanying drawings, in which—

Figure 1 shows diagrammatically a control system for a pair of single-phase motors arranged in accordance with my invention; Figs. 2 to 9, inclusive, are diagrams of the running and transitional circuit connections produced by the control system of Fig. 1; and Fig. 10 is a diagram of modified starting connection.

Referring first to Fig. 2, A represents the armature, B the exciting winding, and C the inducing winding of a single-phase commutator-motor. The winding C, which acts as the inducing winding for repulsion-motor operation, would commonly be termed the compensating winding in series-motor operation, but to avoid unnecessary words, I shall simply term this winding the "inducing winding", with the understanding that the term applies both to repulsion and to compensated series motors, and designates the winding which produces a magnetomotive force in line with that of the armature. D represents a transformer for supplying current to the motor. E represents a resistance. In this figure, which shows the starting connections, the motor windings are connected in series with each other and with the resistance E across a portion of the transformer D, but with the armature A short-circuited,—that is, the motor is connected as a repulsion motor with the resistance E serving as a starting resistance to limit the starting current.

Fig. 3 shows the first running connections, which are like those of Fig. 2, except that the resistance E is cut out or short-circuited.

Fig. 4 shows a transitional connection, in which a connection is made from the junction of exciting winding B and inducing winding C through resistance F to an intermediate point on the transformer D. If resistance F were not included in this connection, the exciting winding B would be connected directly across a portion of the transformer, so that the motor would have the characteristics of a shunt motor, and the amount and phase of the flux of winding B would be rigidly fixed by the voltage impressed on its terminals. A sudden transition to this connection from that of Fig. 3 would be likely to produce flashing at the commutator, but with the connections to the intermediate point on the transformer made through resistance F, no liability to flashing is produced, since the motor characteristics are then rather those of a compound motor, than of a shunt motor.

Fig. 5 shows another transitional set of connections differing from Fig. 4 only in that the armature short-circuit has been opened. It will be seen that if the circuit of resistance F were opened, the motor would then be connected as a compensated series motor, but the connection through the resistance maintains a closed circuit for the armature through the exciting winding and a small portion of the transformer winding.

In Fig. 6 the resistance F is cut out, or short-circuited. The connections of this figure are the same as those disclosed as high-speed running connections in my former application, above referred to. It will be seen that the voltage of that portion of the transformer D between its right-hand terminal and its intermediate tap is impressed on armature A and exciting winding B in series, and that the transition from the connections of Figs. 3 has been made gradually without any abrupt change in the motor characteristics.

Figure 6:
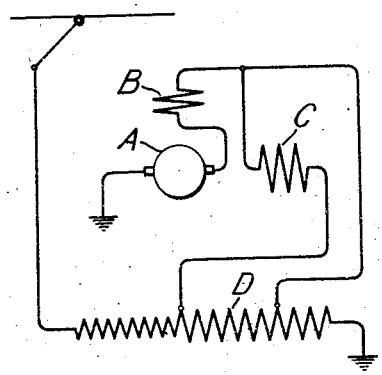
Figure 8:
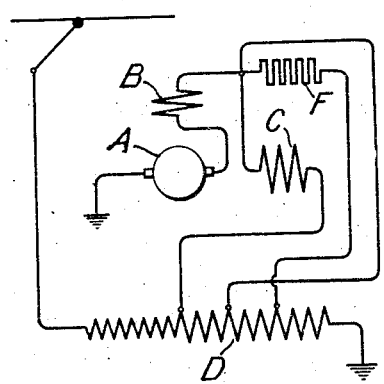
Fig. 8 shows another transitional connection in which a direct connection is made from the junction of inducing and exciting windings to another intermediate point on the transformer. The presence of resistance F prevents the portion of the transformer between the two intermediate taps being short-circuited.
Figure 9:
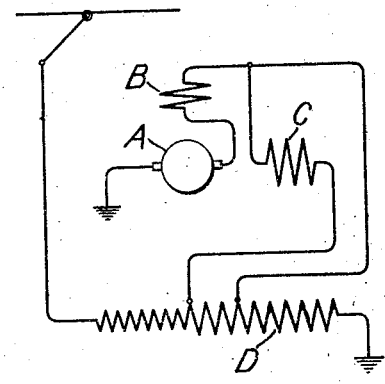

Fig. 9, which shows the running connection for highest speed, differs from Fig. 8 in that the connection in which resistance F is included is opened. Fig. 9 is like Fig. 6, except that a higher voltage is impressed on armature and exciting windings.

Figure 1:
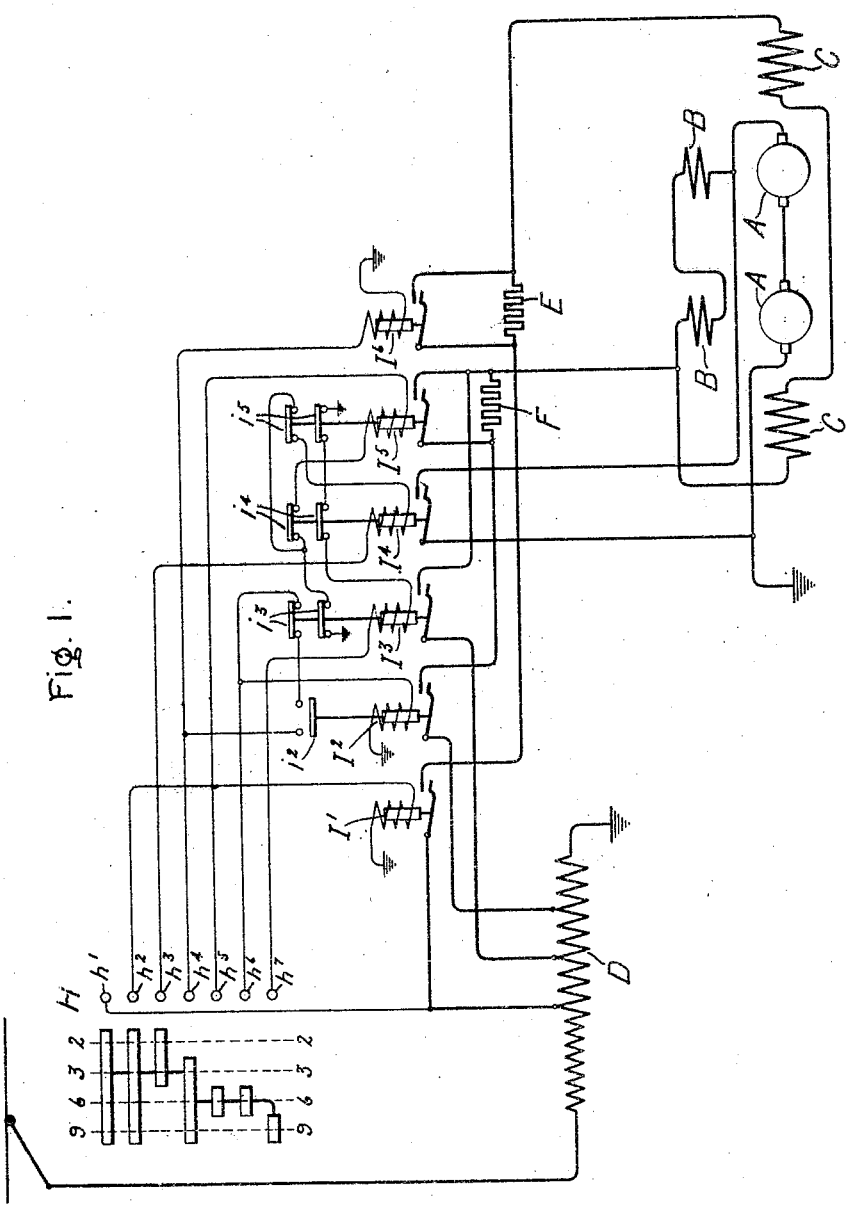
Figure 2:
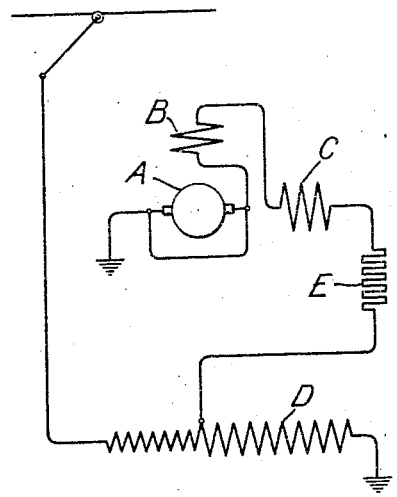
Figure 3:
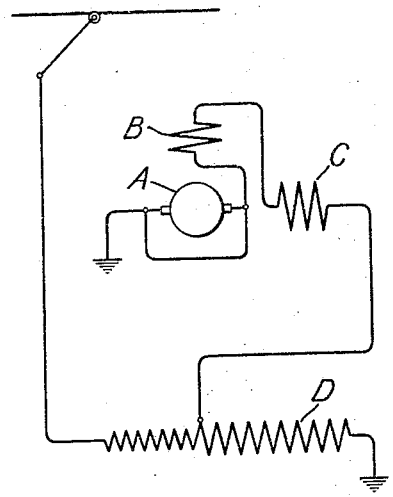
Figure 4:
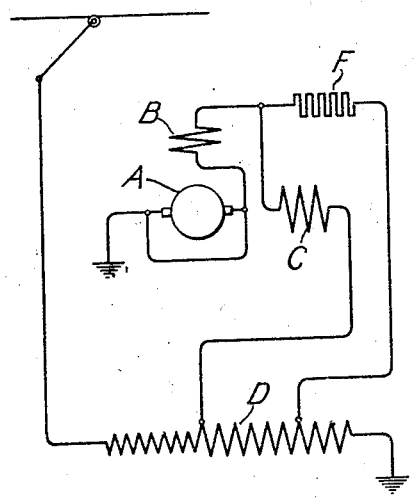
Figure 5:
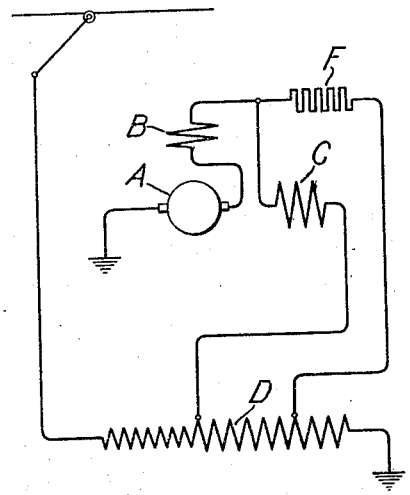
Figure 7:
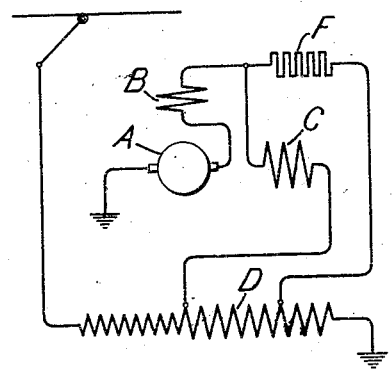
Fig. 7 shows another transitional connection employed in increasing the voltage impressed on armature and exciting winding in order to adapt the motor for higher speed. In this figure the resistance F is re-inserted in the connection to the intermediate point on the transformer.

Now, referring to Fig. 1, the arrangement and purpose of the controlling switches there shown will be clear. H represents a master-switch comprising stationary contact-fingers $h^1$ to $h^7$ and movable contacts shown developed on a plane surface. The four running positions of switches H are indicated by four dotted lines, numbered to correspond to the diagrams which show the motor connections corresponding to the several running positions of switch H. $I^1$ to $I^6$ inclusive, represent electrically-actuated switches or contactors controlled by the switch H and controlling the motor connections. Two motors are shown in Fig. 1, and it will be understood that as many motors, or pairs of motors, as desired, can be controlled by the arrangement of switches shown. In order to avoid complicating the diagram, the usual reversing switch is omitted. When the switch H is moved to its first running position, indicated by dotted lines 2—2, a circuit is closed from transformer D through contact-fingers $h^1$ and $h^2$ to contactor $I^1$, which is accordingly energized and closes the motor circuit. At the same time a circuit is closed through contact-fingers $h^1$ and $h^3$ through contactor $I^4$, which short-circuits the motor armatures. The circuit connections shown in Fig. 2 are consequently established. The connection from the lower terminal of the actuating winding of contactor $I^4$ to ground is made through upper contact $i^5$ of contactor $I^5$, and lower contact $i^3$ of contactor $I^3$. The purpose of this connection will hereinafter appear. At starting both contactors $I^3$ and $I^5$ are deënergized, so that contacts $i^3$ and $i^5$ are closed. When switch H is moved to its second position, indicated by dotted line 3—3, the only change is the energizing of contactor $I^6$, which short-circuits the resistance E, thereby producing the circuit connection shown in Fig. 3. As the switch H is moved from its second to its third running position, the latter of which is indicated by dotted line 6—6, several operations of the contactors result, producing several transitional connections before establishing the running connections corresponding to the third position of switch H. Contacts $h^5$ and $h^6$ are simultaneously energized, but the contactor $I^5$, connected to contact-finger $h^5$, is not at first actuated, since its circuit is open at the upper contact $i^4$ of contactor $I^4$. Contactor $I^2$ is, however, energized, thereby establishing a connection from the junction of exciting windings B and inducing windings C through resistance F to an intermediate point on transformer D, thereby producing the connections shown in Fig. 4. Nothing further happens until contact-finger $h^3$ is deenergized, when contactor $I^4$ drops, thereby opening the armature short-circuit and producing the connections of Fig. 5. The dropping of contactor $I^4$ causes contactor $I^5$ to pick up, its circuit being closed through contact-fingers $h^1$ and $h^5$, contactor $I^5$, upper contact $i^4$, and lower contact $i^3$. The picking up of contactor $I^5$ short-circuits resistance F, and establishes the connections of Fig. 6, which are the running connections for the third position of the master-switch H. It will be noted that the successive operations of contactors $I^2$, $I^4$ and $I^5$ follow automatically in their proper sequence, because of the interlocking connections and contacts. When switch H is moved from its third to its fourth and final position, contact-finger $h^7$ is energized, but contactor $I^3$ does not pick up, since its circuit is open at lower contact $i^5$. As soon as contact-finger $h^5$ leaves its movable contact, contactor $I^5$ is deënergized, opening the short-circuit around resistance F, and producing the connections of Fig. 7. The closing of lower contact $i^5$ energizes contactor $I^3$, which picks up, producing the connections of Fig. 8. Contact-finger $h^6$ has been deënergized before this, but contactor $I^2$ does not fall until after contactor $I^3$ picks up, on account of the maintaining circuit formed from the lower terminal of contactor $I^2$ through upper contact $I^3$ and contact $i^2$ to contact-finger $h^4$. As soon as contactor $I^3$ picks up this circuit is broken and contactor $I^2$ drops, thereby establishing the connections of Fig. 9. The interlocking contacts serve to produce the proper sequence of operations, not only while the master-switch H is moved from off to running position, but also when it is moved in the opposite direction. The contactor operations, which occur during the latter movement of the master-switch, need not be described in detail, since they will be evident from the drawing, in view of what has already been said. It is particularly to be noted that the maintaining circuit for contactor $I^2$ formed by contacts $i^3$, $i^2$, and $h^4$ prevents the contactor from opening until the starting position of switch H is reached, contactor $I^6$ opened, and resistance E cut into circuit.

Figure 10:
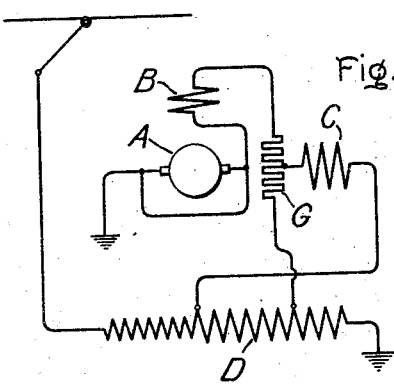

Fig. 10 shows a diagram of starting connections which may be employed in place of the connections of Fig. 2. A resistance G is shown, to an intermediate point of which one terminal of the inducing winding C is connected. The exciting winding B is connected to the upper terminal of resistance G, while connection is made from the lower terminal of the resistance to an intermediate point on transformer D. If this latter connection were opened, the connections of Fig. 10 would be the exact equivalent of the connections of Fig. 2, the upper half of resistance G taking the place of resistance E. On the other hand, if the upper part of resistance G were short-circuited, the connections of Fig. 10 would be somewhat similar to the starting connections which I have described in a former application, Serial No. 400,102, filed October 31, 1907, in which there is impressed on the exciting winding at starting, through a resistance, a shunt voltage for the purpose of fixing the amount and phase of the field flux. The arrangement of Fig. 10 is in effect a combination of the arrangement of Fig. 2, and that of my former application. It has the effect of producing a compound characteristic at starting,—that is, a shunt excitation superposed on the series excitation of Fig. 2. With the connection of Fig. 2 the currents induced in the armature coil short-circuited by the brushes, due to the transformer action of the flux of the exciting winding B, react upon that flux, and at the instant of starting, when those currents are large, they tend to shift the phase of the exciting flux, so that it is no longer in phase with the motor current, and the starting torque is consequently lowered. The shunt excitation which, in Fig. 10, is superposed on the series excitation, tends to prevent this phase shifting of the exciting flux, and consequently increases the starting torque, while; as compared with the shunt connection of my earlier application, the commutation of the arrangement of Fig. 10 is better.

In the drawings I have shown the motors diagrammatically, without illustrating their structure, which in its preferred form is shown in my former application, Serial No. 383,807, above referred to. In order to secure the full advantages of my present control, as regards commutation, the fractional pitch armature winding, fully illustrated and described in my former application, should be employed, and preferably the compensating winding should contain a greater number of turns than the armature winding for the reasons therein set forth.

I do not desire to limit myself to the particular construction and arrangement of parts here shown, but aim in the appended claims to cover all modifications which are within the scope of my invention.

What I claim as new and desire to secure by Letters Patent of the United States, is,—

1. The method of operating a single-phase motor of the commutator type having inducing and exciting windings on the stator, which consists in starting the motor with the armature short-circuited, then impressing a voltage on the exciting winding and a resistance in series, then opening the armature short-circuit so as to include the armature in circuit with the exciting winding, and then cutting out said resistance.

2. The method of operating a single-phase motor of the commutator type having inducing and exciting windings on the stator, which consists in starting the motor with all the motor windings connected in series but with the armature short-circuited, then impressing a shunt voltage on the exciting winding, short-circuited armature and a resistance in series, then opening the armature short-circuit, and then cutting out said resistance.

3. The method of operating a single-phase motor of the commutator type having inducing and exciting windings on the stator, which consists in connecting all three windings in series to the source but with the armature short-circuited, the exciting winding being next to the armature, then establishing a connection through a resistance from the junction of the inducing winding and the circuit of the other two windings to an intermediate point on the source, then opening the armature short-circuit, and then cutting out the resistance.

4. The method of operating a single-phase motor of the commutator type having inducing and exciting windings on the stator, which consists in connecting all three windings in series to the source but with the armature short-circuited, the exciting winding being next to the armature, then establishing a connection through a resistance from the junction point of inducing winding and the circuit of the other two windings to an intermediate point on the source, then opening the armature short-circuit, then cutting out the resistance, then cutting in the resistance again, establishing a direct connection from said junction point to another point on the source, and then open-circuiting the connection through the resistance.

5. The method of operating a single-phase motor of the commutator type having inducing and exciting windings on the stator, which consists in starting the motor with the armature short-circuited and with a resistance in series with the motor, then short-circuiting said resistance, then impressing a shunt-voltage on the exciting winding and a resistance in series, then opening the armature short-circuit, and then short-circuiting the latter resistance.

6. The method of operating a single-phase motor of the commutator type having inducing and exciting windings on the stator, which consists in starting the motor with the inducing and exciting windings in series with each other, the armature short-circuited and a resistance in series with the motor, short-circuiting the resistance when the motor has started, and running the motor at high speeds with a shunt-voltage impressed on armature and exciting windings in series.

7. The method of starting a single-phase motor of the commutator type having inducing and exciting windings on its stator, which consists in connecting the inducing and exciting windings in series to the source with the armature short-circuited and with a resistance in series with the motor and impressing a shunt-voltage on the exciting winding through a resistance.

8. In combination with a single-phase motor of the commutator type having inducing and exciting windings on the stator, a transformer for supplying current to the motor, a resistance, and a controller having its contacts arranged in one position to connect the motor windings in series to the transformer with the armature short-circuited, and in subsequent positions to connect the exciting winding, short-circuited armature, and resistance in series across a portion of the transformer, then to open the armature short-circuit, and then to short-circuit said resistance.

9. In combination with a single-phase motor of the commutator type having inducing and exciting windings on the stator, a transformer for supplying current to the motor, a resistance, and a controller having its contacts arranged in one position to connect the motor windings in series to the transformer with the armature short-circuited and the exciting winding next to the armature, and in subsequent positions to connect the junction point of inducing winding and the circuit of the other two windings through said resistance to an intermediate point on the transformer winding, then to open the armature short-circuit, and then to short-circuit said resistance.

10. In combination with a single-phase motor of the commutator type having inducing and exciting windings on the stator, a transformer for supplying current to the motor, a resistance, and a controller having its contacts arranged in one position to connect the motor windings in series to the transformer with the armature short-circuited and the exciting winding next to the armature, and in subsequent positions to connect the junction point of inducing winding and the circuit of the other two windings through said resistance to an intermediate point on the transformer winding, then to open the armature short-circuit, then to short-circuit said resistance, and in still subsequent positions to cut in said resistance again, to establish a direct connection from said junction point to another point on the transformer, and then to open the connection containing said resistance.

11. In combination with a single-phase motor of the commutator type having inducing and exciting windings on the stator, a transformer for supplying current to the motor, two resistances, and a controller having its contacts arranged in its first position to connect the motor windings in series to the transformer with the armature short-circuited and with one of said resistances in series with the motor, in a subsequent position to short-circuit said resistance, and in still subsequent positions to connect the exciting winding, short-circuited armature, and the other resistance, in series across a portion of the transformer, then to open the armature short-circuit, and then to short-circuit the latter resistance.

12. In combination with a single-phase motor of the commutator type having inducing and exciting windings on the stator, a transformer for supplying current to the motor, a resistance, and a controller having its contacts arranged in its first position to connect the motor windings in series to the transformer with the inducing and exciting windings in series with each other, with the armature short-circuited and with said resistance in series with the motor, in a subsequent position to short-circuit said resistance, and in a still subsequent position to connect the armature and exciting winding in series across a portion of said transformer.

13. In combination with a single-phase motor of the commutator type having inducing and exciting windings on the stator, a transformer for supplying current to the motor, a resistance, and a controller having its contacts arranged in one position to connect the motor windings in series to the transformer with the armature short-circuited and in subsequent positions to connect the exciting winding, short-circuited armature, and resistance in series across a portion of the transformer, then to open the armature short-circuit, and then to short-circuit said resistance, said controller comprising a master-switch and magnetically actuated switches controlled thereby and electrically interlocked to insure their operation in proper order.

14. In combination with a single-phase motor of the commutator type having inducing and exciting windings on the stator, a transformer for supplying current to the motor, a resistance, and a controller having its contacts arranged in one position to connect the motor windings in series to the transformer with the armature short-circuited and the exciting winding next to the armature, and in subsequent positions to connect the junction point of inducing winding and the circuit of the other two windings through said resistance to an intermediate point on the transformer winding, then to open the armature short-circuit, and to short-circuit said resistance, said controller comprising a master-switch and magnetic-ally actuated switches controlled thereby and electrically interlocked to insure their operation in proper order.

15. In combination with a single-phase motor of the commutator type having inducing and exciting windings on the stator, a transformer for supplying current to the motor, a resistance, and a controller having its contacts arranged in one position to connect the motor windings in series to the transformer with the armature short-circuited and the exciting winding next to the armature, and in subsequent positions to connect the junction point of inducing winding and the circuit of the other two windings through said resistance to an intermediate point on the transformer winding, then to open the armature short-circuit, then to short-circuit said resistance, and in still subsequent positions to cut in said resistance again, to establish a direct connection from said junction point to another point on the transformer, and then to open the connection containing said resistance, said controller comprising a master-switch and magnetically actuated switches controlled thereby and electrically interlocked to insure their operation in proper order.

16. In combination with a single-phase motor of the commutator type having inducing and exciting windings in its stator, a transformer for supplying current to the motor, a resistance, means for connecting the motor windings in series to the transformer with the exciting winding next to the armature, a switch for short-circuiting the armature, a switch for establishing a connection from the junction point of the inducing winding and the circuit of the other two windings through said resistance to an intermediate point on the transformer, a magnetically actuated switch for short-circuiting said resistance, and contacts controlled by the first-mentioned switch controlling the actuating magnet of the last-mentioned switch.

17. In combination with a single-phase motor of the commutator type having inducing and exciting windings on its stator, a transformer for supplying current to the motor, a resistance, means for connecting the motor windings in series to the transformer with the exciting winding next to the armature, magnetically actuated switches arranged respectively to short-circuit the armature, to establish a connection through said resistance from the junction of the inducing winding and the circuit of the other two windings to an intermediate point on said transformer, and to short-circuit said resistance, and contacts controlled by one of said switches controlling the actuating magnets of another of said switches.

18. In combination with a single-phase motor of the commutator type having inducing and exciting windings on its stator, a transformer for supplying current to the motor, means for connecting the motor windings in series to the transformer, and a controller comprising a master-switch and magnetically actuated switches controlled thereby arranged in one position to connect the motor windings in series to the transformer with the armature short-circuited and in another position to connect armature and exciting winding in series across a portion of the transformer and to establish certain transitional connections in passing from one position to another, and contacts controlled by certain of said magnetically actuated switches and controlling the actuating magnets of other switches, said contacts and connections forming an electric interlock whereby the sequence of connections is produced automatically and in proper order.

19. In combination with a single-phase motor of the commutator type having inducing and exciting windings on its stator, a transformer for supplying current to the motor, a controller having its contacts arranged in its first position to connect the motor windings in series to the transformer with the armature short-circuited and to connect the exciting winding across a portion of the transformer, a resistance in series with the motor, and a resistance in the connections from the exciting winding to the transformer.

20. In combination with a single-phase motor of the commutator type having inducing and exciting windings on its stator, a transformer for supplying current to the motor, a resistance, and means for connecting at starting one terminal of the inducing winding to the transformer and its other terminal to an intermediate point on said resistance, one terminal of the exciting winding to the transformer and the other terminal to one terminal of the resistance, and the other terminal of the resistance to an intermediate point on the transformer, and for short-circuiting the armature.

In witness whereof, I have hereunto set my hand this 2nd day of January, 1908.

ERNST F. W. ALEXANDERSON.

Witnesses:
BENJAMIN B. HULL,
HELEN ORFORD.